United States Patent
Miyazawa

(10) Patent No.: US 6,816,190 B1
(45) Date of Patent: Nov. 9, 2004

(54) ELECTRONIC CAMERA HAVING A PLURALITY OF STORAGE MEDIA

(75) Inventor: Azuma Miyazawa, Mitaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 833 days.

(21) Appl. No.: 09/598,041

(22) Filed: Jun. 21, 2000

(30) Foreign Application Priority Data

Jun. 22, 1999 (JP) ............................................. 11-175480

(51) Int. Cl.⁷ ............................................... H04N 5/76
(52) U.S. Cl. ............................... 348/231.6; 348/231.1; 348/231.7
(58) Field of Search ......................... 348/207.99, 207.1, 348/207.11, 231.99, 231.1, 231.2, 333.01, 333.02, 333.04, 231.7, 231.8, 231.9, 231.6; 386/68, 70, 125, 126, 109, 117

(56) References Cited

U.S. PATENT DOCUMENTS

| | | | | |
|---|---|---|---|---|
| 5,153,730 A | * | 10/1992 | Nagasaki et al. | 348/231.6 |
| 5,523,857 A | * | 6/1996 | Fukushima | 386/125 |
| 5,525,957 A | * | 6/1996 | Tanaka | 348/220.1 |
| 5,576,840 A | * | 11/1996 | Fukushima | 386/46 |
| 6,157,773 A | * | 12/2000 | Yamagishi | 386/109 |
| 6,253,023 B1 | * | 6/2001 | Fukushima et al. | 386/117 |

FOREIGN PATENT DOCUMENTS

| | | |
|---|---|---|
| JP | 2-27753 | 6/1990 |
| JP | 03-109478 | 11/1991 |
| JP | 05-276472 | 10/1993 |
| JP | 5-292441 | 11/1993 |

* cited by examiner

*Primary Examiner*—Tuan Ho
(74) *Attorney, Agent, or Firm*—Frishauf, Holtz, Goodman & Chick, P.C.

(57) ABSTRACT

An electronic camera can be loaded with a semiconductor memory and a storage medium that has a storage capacity larger than that of the memory and is rotated to record or reproduce data. Digital image data obtained by photographing are recorded in the memory. When the residual storage capacity of the memory reaches a predetermined value, the digital image data recorded in the memory are transferred to the storage medium.

13 Claims, 4 Drawing Sheets

ELECTRONIC CAMERA HAVING A PLURALITY OF STORAGE MEDIA

CROSS-REFERENCE TO RELATED APPLICATIONS

This application is based upon and claims the benefit of priority from the prior Japanese Patent Application No. 11-175480, filed Jun. 22, 1999, the entire contents of which are incorporated herein by reference.

BACKGROUND OF THE INVENTION

The present invention relates to an improvement of an electronic camera for compressing image data of digital values obtained by photographing and recording them in a storage medium.

As is generally known, a novel electronic camera has recently been developed, in which optical images of a photographed subject are photoelectrically converted into image data of digital values by means of an image pickup device. These image data are compressed and recorded in a storage medium.

Recently, moreover, recording/reproducing devices that use disk-shaped storage media, such as hard disk devices, magnetooptic disk devices, etc., have been downsized, reduced in weight, and redesigned for larger capacities, and the way of incorporating the devices of this type into electronic cameras has been investigated.

Since these recording/reproducing devices are provided with a rotating unit for rotating a disk, power consumption is a critical problem to them. The rotating unit consumes much power especially during starting operation in which the disk in a stationary state is caused to reach a fixed steady rotational speed.

In view of the problem of power consumption, therefore, it is to be desired that the rotating unit should not repeat start/stop operation with high frequency. However, the electronic camera requires obtained digital image data to be recorded in a storage medium with every shot.

Inevitably, therefore, the rotating unit is used in a manner such that it repeats the start/stop operation highly frequently. In consequence, it substantially dissipates power from the power source of the electronic camera, so that the life of batteries for use as the power source is shortened considerably.

BRIEF SUMMARY OF THE INVENTION

The present invention has been contrived in consideration of these circumstances, and its object is to provide an electronic camera designed so that the frequency of repetition of start/stop operation of a rotating unit for rotating a disk for use as a storage medium can be lowered to restrain power consumption, and that digital image data obtained by photographing can be securely recorded in the disk.

An electronic camera according to the present invention comprises first recording means for recording digital image data obtained by photographing in a semiconductor memory, detecting means for detecting the attainment of a predetermined value by the residual storage capacity of the semiconductor memory, and second recording means adapted to be rotated to transfer to and record all the digital image data stored in the semiconductor memory in a storage medium having a storage capacity larger than that of the semiconductor memory, in accordance with the result of detection by the detecting means.

According to the arrangement described above, all the digital image data stored in the semiconductor memory are transferred to and recorded in the rotatable storage medium having the capacity larger than the memory capacity when the predetermined value is reached by the residual storage capacity of the memory. Thus, the frequency of repetition of start/stop operation of a rotating unit for rotating a disk for use as the storage medium can be lowered to restrain power consumption, and the digital image data obtained by photographing can be securely recorded in the disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below serve to explain the principles of the invention.

DETAILED DESCRIPTION OF THE INVENTION

Figure 1:
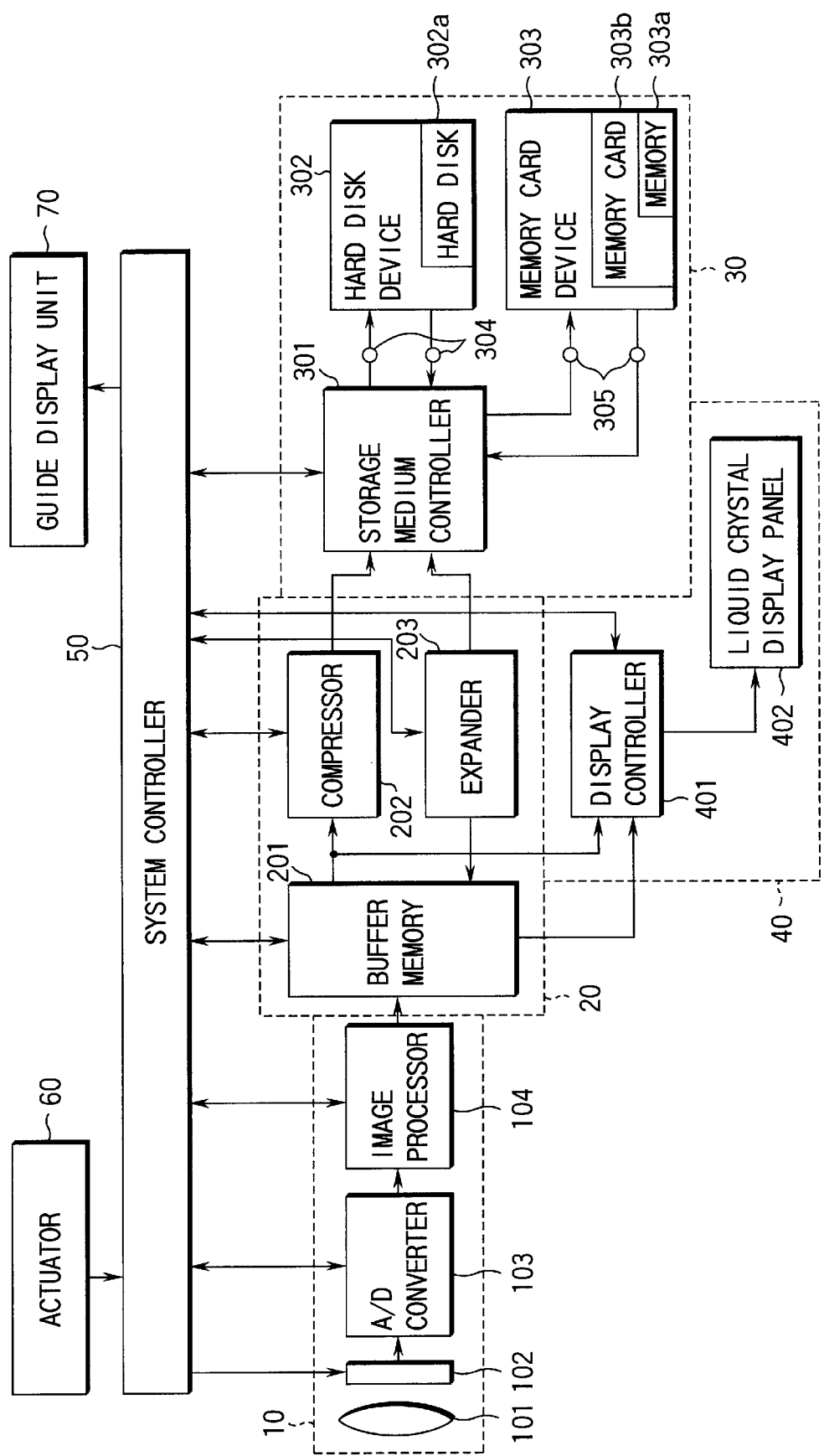
FIG. 1 is a block diagram for illustrating an embodiment of an electronic camera according to the present invention.

An embodiment of the present invention will now be described in detail with reference to the accompanying drawings. FIG. 1 shows an electronic camera, which will be described in connection with this embodiment. The electronic camera shown in FIG. 1 generally comprises an image pickup unit 10, image data processor 20, image data recorder 30, image data display unit 40, system controller 50, actuator 60, and guide display unit 70.

The image pickup unit 10 is composed of an image pickup lens 101, a CCD (charge coupled device) image pickup device 102 for converting an optical image applied through the lens 101 into an electrical signal, an A/D (analog/digital) converter 103 for converting the output signal of the image pickup device 102 into digital data, and an image processor 104 for subjecting the output data of the converter 103 to signal processing, such as white balance adjustment, gamma correction, etc.

The image data processor 20 is composed of a buffer memory 201, compressor 202, and expander 203. The memory 201 can temporarily store image data for a plurality of static images, each of which corresponds to one frame of image data processed in the image processor 104, for example. The compressor 202 compresses the output image data of the memory 201. The expander 203 expands the compressed image data read from a storage medium (mentioned later) and supplies them to the memory 201.

The image data recorder 30 is composed of a storage medium controller 301, hard disk device 302, and memory card device 303. The devices 302 and 303 can be loaded into and unloaded from the controller 301.

The hard disk device 302 can rotate a hard disk 302a that has a storage capacity of, e.g., 1 GB (gigabyte), thereby recording or reproducing digital data, as electric power is supplied from the storage medium controller 301, that is, from the body of the electronic camera.

In recording operation in this hard disk device 302, the compressed image data delivered from the compressor 202 are stored in the hard disk 302a through the storage medium controller 301. In reproducing operation, regenerative data read from the hard disk 302a are applied to the expander 203 through the controller 301. The hard disk 302a may be of a removable type, such as MO (magnetooptics) or MD (minidisk) data.

Further, a memory card 303b, which is mounted with a semiconductor memory 303a having a storage capacity of, e.g., 4 MB (megabytes), can be loaded into and unloaded from the memory card device 303. As electric power is supplied from the storage medium controller 301 or the electronic camera body, digital data can be recorded in or reproduced from the memory card 303b.

In recording operation in this memory card device 303, the compressed image data delivered from the compressor 202 are stored in the memory card 303b through the storage medium controller 301. In reproducing operation, regenerative data read from the memory card 303b are applied to the expander 203 through the controller 301.

Here it is highly important that the regenerative data read from the memory card 303b can be applied to the hard disk device 302 through the controller 301 and recorded in the hard disk 302a.

Both the hard disk device 302 and the memory card device 303 are unitized, and can be loaded into and unloaded from the storage medium controller 301 or the electronic camera body through terminals 304 and 305, respectively, so that they can be replaced with ease. In the case where the MO or MD data are used, they need not be replaced in the same manner as the hard disk 302a, since media are replaceable.

FIG. 1 mainly shows flows of data. Apparently, therefore, the hard disk device 302 and the memory card device 303 are attached to the electronic camera body by means of the terminals 304 and 305 only. It is to be understood, however, that the electronic camera body actually is provided with setting portions that can be removably fitted with the devices 302 and 303 and can mechanically hold them in an attached state.

The image data display unit 40 is composed of a display controller 401 and a liquid crystal display panel 402. The display controller 401 fetches image data recorded during image pickup operation from the buffer memory 201, and causes the display panel 402 to display them, so that a user can observe an image obtained during the image pickup operation.

The display controller 401 also fetches reproduced image data from the buffer memory 201 during the reproducing operation of the hard disk device 302 or the memory card device 303, and causes the display panel 402 to display them. Thus, the display panel 402 serves as an electronic viewfinder (EVF).

The system controller 50 is an element that generally controls the electronic camera in order to realize various functions of the camera effectively. Characteristic operations of the controller 50 will be described later with reference to flowcharts.

The actuator 60 is provided on, for example, a side face or the top surface of the electronic camera body so that the user can easily operate keys. The actuator 60 includes, for example, a power switch, release switch, various regulator switches, etc., and its operation information is read by means of the system controller 50.

The guide display unit 70, which is composed of a liquid crystal panel, is located on the top surface of the electronic camera body, for example. When the EVF is off, the display unit 70 displays guide messages under the display control of the system controller 50. The guide messages are related to, for example, battery power dissipation, destination of image recording (hard disk 302a or memory card 303b), etc.

Figure 2:
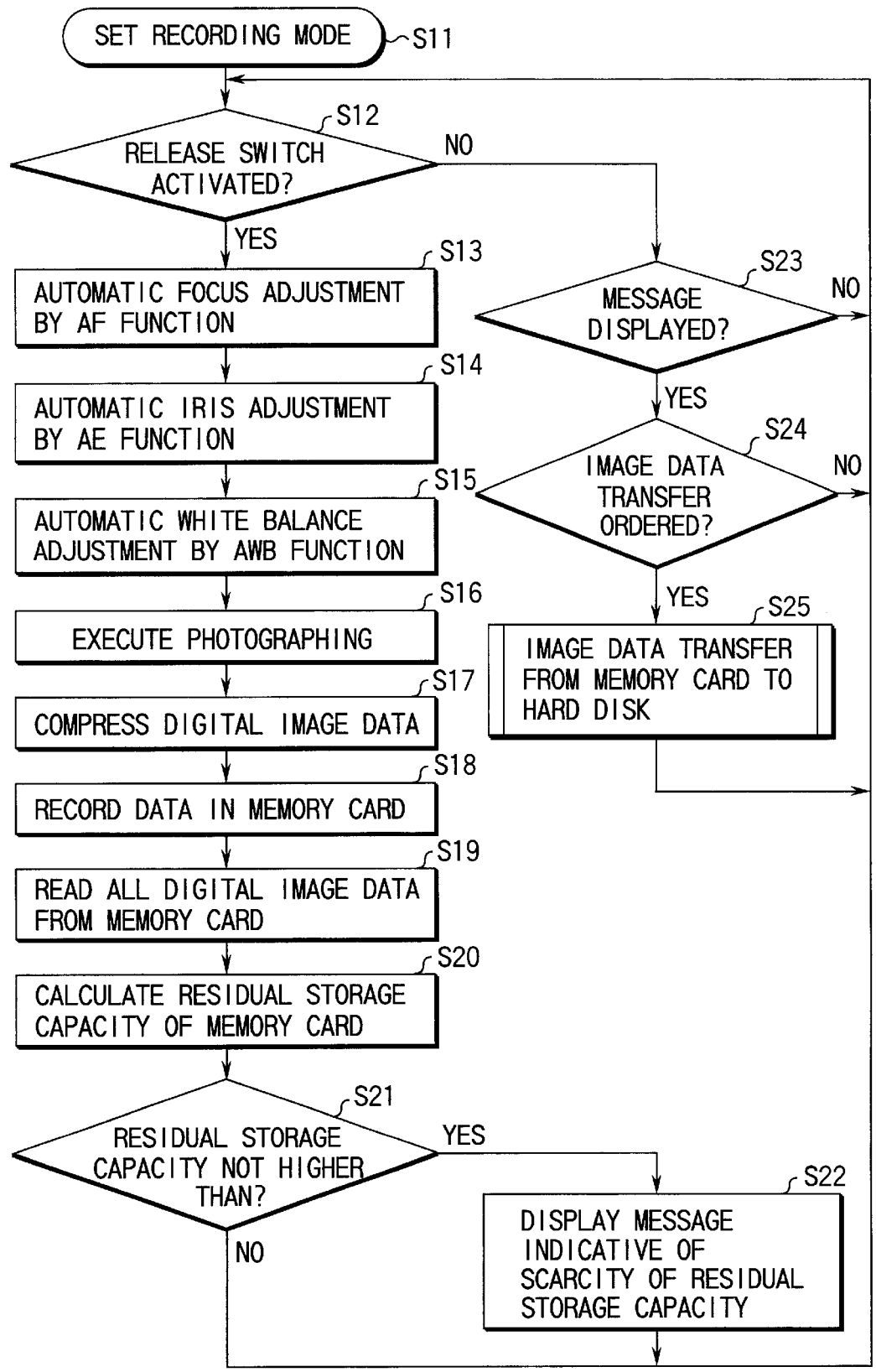
FIG. 2 is a flowchart showing the operation of the electronic camera according to the embodiment and illustrating processing operation for a function to record digital image data, obtained by photographing, in a memory card and a function to transfer the digital image data recorded in the memory card to a hard disk when the residual capacity of the card is reduced to a fixed value less.

Characteristic operations of the electronic camera according to this embodiment will be described with reference to the flowcharts of FIGS. 2 and 3. FIG. 2 shows processing operation for a function to record the digital image data, obtained by photographing, in the memory card 303b and a function to transfer the digital image data recorded in the memory card 303b to the hard disk 302a when the residual capacity of the card 303b is reduced to a fixed value or less by the recording function.

As the user first operates the actuator 60, a recording mode is established in the system controller 50 (Step S11). Thereupon, the controller 50 determines whether or not the release switch of the actuator 60 is operated (Step S12).

If it is concluded that the release switch is operated (YES), the system controller 50 actuates an automatic focusing (AF) function to perform automatic focus adjustment (Step S13), actuates an automatic exposure (AE) function to perform automatic iris adjustment (Step S14), actuates an automatic white balance (AWB) function to perform automatic white balance adjustment (Step S15), and executes photographing (Step S16).

Then, the system controller 50 subjects the digital image data obtained by photographing by means of the image pickup unit 10 to a compression process in the image data processor 20 (Step S17), and causes the image data recorder 30 to record the data in the memory card 303b (Step S18).

Thereafter, the system controller 50 reads all the digital image data recorded in the memory card 303b (Step S19), and calculates the residual storage capacity of the card 303b according to the volume of the read data and the full storage capacity of the card 303b (Step S20).

Then, the system controller 50 determines whether or not the calculated residual storage capacity is not higher than the fixed value (Step S21). This discrimination can be executed by determining, for example, whether or not the ratio of the residual storage capacity to the full storage capacity is not higher than 50%. If it is concluded that the residual storage capacity is higher than the fixed value (NO), the system controller 50 proceeds to the process of Step S12.

If it is concluded that the residual storage capacity is not higher than the fixed value (YES), on the other hand, the system controller 50 displays a message (warning) to the effect that the residual storage capacity is scarce (Step S22), whereupon the program advances to the process of Step S12.

For this message, "MEMORY IS FULL, TRANSFER TO DISK" or the like may be displayed on the liquid crystal display panel 402 when the EVF is on, for example.

When the EVF is off, the guide display unit 70 is flickered to indicate the scarcity of the residual storage capacity of the memory card 303b or displays images that represent by stages the way the residual storage capacity decreases.

If it is concluded in Step S12 that the release switch is not operated (NO), on the other hand, the system controller 50 determines whether or not the message of Step S22 indicative of the scarcity of the residual storage capacity is being displayed (Step S23). If it is concluded that the message is not being displayed (NO), the program advances to the process of Step S12.

If it is concluded that the message is being displayed (YES), the system controller 50 determines whether or not an order (by manual operation) is given to transfer image data from the memory card 303b to the hard disk 302a (Step S24). If it is concluded that the order is not given (NO), the program advances to the process of Step S12.

If it is concluded that the order is given to transfer image data (YES), the system controller 50 transfers all the digital image data recorded in the memory card 303b to the hard disk 302a (Step S25), whereupon the program advances to the process of Step S12.

Figure 3:
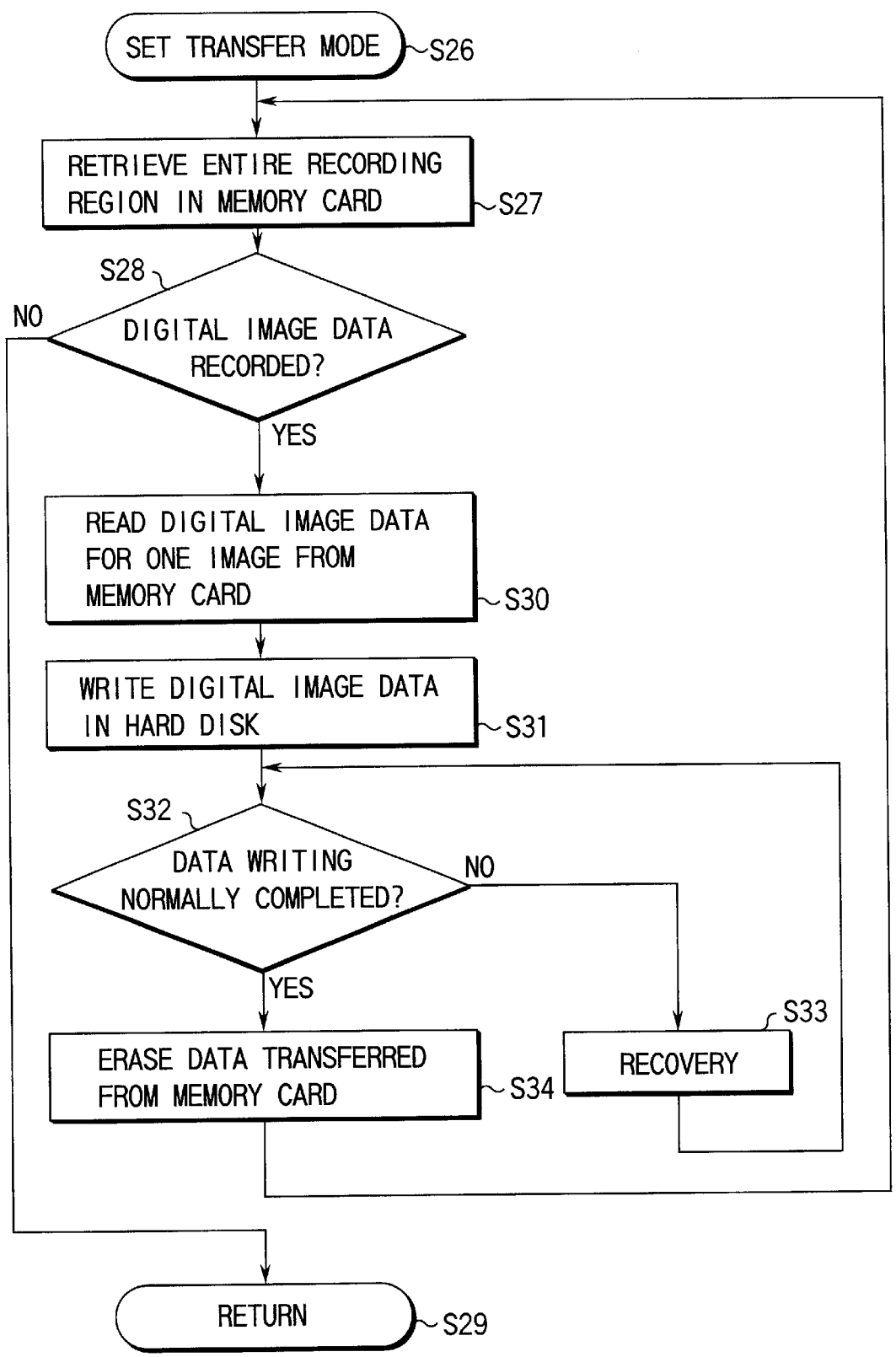
FIG. 3 is a flowchart showing the operation of the electronic camera of the embodiment and illustrating a specific operation for an image data transfer process.

FIG. 3 shows a specific operation for the image data transfer process of Step S25. As the user first operates the actuator 60, a transfer mode is established in the system controller 50 (Step S26). Thereupon, the controller 50 retrieves the entire recording region in the memory card 303b (Step S27), and determines whether or not digital image data are recorded (Step S28).

If it is concluded that no digital image data are recorded in the memory card 303b (NO), the system controller 50 is returned (Step S29) to the original flowchart, that is, to the process of Step S12.

If it is concluded that digital image data are recorded in the memory card 303b (YES), the system controller 50 reads digital image data for one static image from the card 303b (Step S30) and executes operation for writing those data in the hard disk 302a (Step S31).

Thereafter, the system controller 50 determines whether or not the writing of the digital image data in the hard disk 302a is normally completed (Step S32). This discrimination can be executed by determining, for example, whether or not external vibration of a given value or more is applied during the writing operation.

If it is concluded that the data writing is not carried out normally (NO), the system controller 50 executes a recovery process (Step S33), whereupon the program proceeds again to the process of Step S32. In this recovery process, data having failed to be written normally, for example, are reloaded into another region on the hard disk 302a, and the contents of the original region are erased.

If it is concluded in Step S32 that the data writing is carried out normally (YES), the system controller 50 erases the digital image data transferred from the memory card 303b to the hard disk 302a (Step S34), whereupon the program advances to the process of Step S27.

In the aforesaid transfer process, the hard disk device 302 controls the hard disk 302a lest its rotation be stopped before the transfer of all the digital image data in the memory card 303b to the disk 302a is completed once the rotation of the disk 302a is started, in order to record the first digital image data in the disk 302a.

According to the embodiment described above, the obtained digital image data are successively written in the memory card 303b with every shot. When the residual storage capacity of the card 303b is reduced to the fixed value or less, all the digital image data recorded in the card 303b are collectively transferred to the hard disk 302a.

Thus, the frequency of repetition of the start and stop of the rotation of the hard disk 302a can be lowered, so that the power consumption can be reduced to prevent the battery life from being shortened unduly. The level of the residual storage capacity of the memory card 303b at which the data are expected to be transferred to the disk 302a should only be set as required.

The digital image data obtained by photographing are stored in the memory card 303b that is mounted with the semiconductor memory 303a, so that they can be securely recorded with low power consumption without substantially influenced by external vibration or shock. Since those digital image data are transferred to the hard disk 302a, the data obtained by photographing never fail to be recorded in the disk 302a.

The memory card 303b may be selected from popular versions that have full storage capacities of 8 MB, 6 MB, and 2 MB. If the memory card 303b used has the large storage capacity of 8 MB, the frequency of data transfer from the card 303b to the hard disk 302a can be lowered, so that the power consumption can be reduced highly effectively.

If the memory card 303b used has the small storage capacity of 2 MB, on the other hand, the frequency of data transfer from the memory card 303b to the hard disk 302a cannot be made very low. Since the transfer time for each cycle is short, however, the card 303b can quickly stand ready for the next shot. Thus, the cycle of data transfer to the hard disk 302a varies according to the storage capacity of the memory card 303b, a suitable capacity should be selected for the card 303b depending on the purpose of use.

The following is a summary of features of the embodiment described above.

(1) The electronic camera according to embodiment comprises first recording means (303) for recording digital image data obtained by photographing in a semiconductor memory (303a), detecting means (50) for detecting the attainment of a predetermined value by the residual storage capacity of the semiconductor memory (303a), and second recording means (302) adapted to be rotated to transfer to and record all the digital image data stored in the semiconductor memory (303a) in a storage medium (302a) having a storage capacity larger than that of the semiconductor memory (303a), in accordance with the result of detection by the detecting means (50).

(2) In the electronic camera according to the embodiment, the semiconductor memory (303a) is mounted on a memory card (303b) capable of being loaded into and unloaded from the body of the electronic camera.

(3) In the electronic camera according to the embodiment, the storage medium (302a) is a disk to be loaded into a disk device (302) removably fitted in the electronic camera body, the disk device (302) being capable of rotating the disk to record or reproduce data as electric power is supplied from the electronic camera body.

(4) In the electronic camera according to the embodiment, the detecting means (50) detects a reduction of the residual storage capacity of the semiconductor memory (303a) to a value equal to or less than half the full storage capacity of the memory (303a).

According to the embodiment described herein, the obtained digital image data are successively written in the memory card 303b with every shot. When the residual storage capacity of the card 303b is reduced to the fixed value or less, all the digital image data recorded in the card 303b are collectively transferred to the hard disk 302a.

Thus, the frequency of repetition of the start/stop operation of a rotating unit for rotating the hard disk 302a can be lowered to restrain the power consumption, and the digital image data obtained by photographing never can be securely recorded in the disk 302a.

Presently, so-called disk cards are being developed. These cards are designed so that a disk for use as a storage medium is incorporated for rotation in a card to record and reproduce digital data. The disk card, though small-sized and light in weight, has a storage capacity about 200 times or more as large as that of the memory card 303b.

Figure 4:
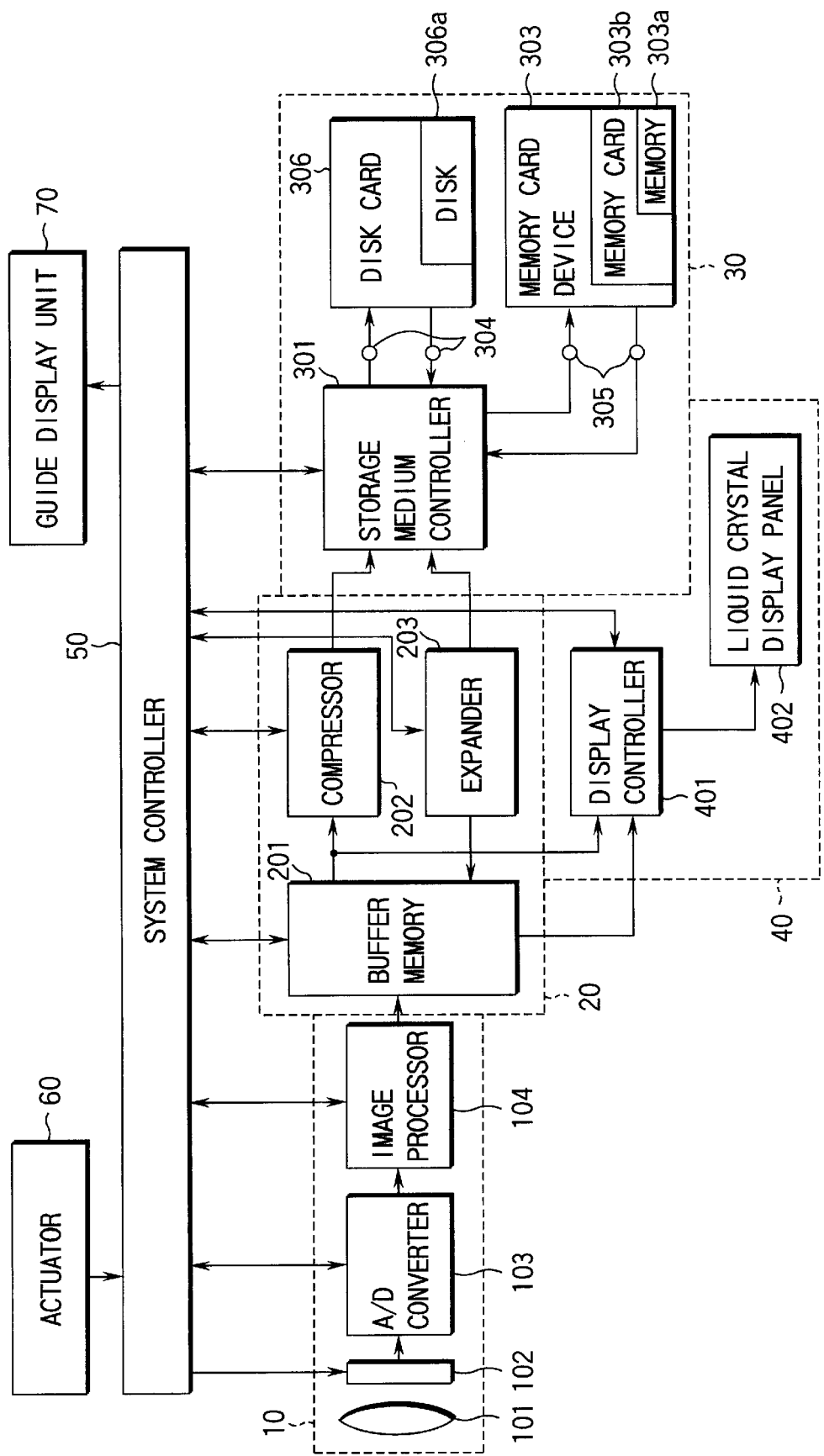
FIG. 4 is a block diagram for illustrating a modification in which a disk card is used in place of a hard disk device according to the embodiment.

As shown in FIG. 4, therefore, the electronic camera body may be designed so that it can be loaded with a disk card 306 in place of the aforesaid hard disk device 302. If the residual storage capacity of the memory card 303b is reduced to the fixed value or less, in this case, all the digital image data stored in the card 303b are collectively recorded in a disk 306a of the disk card 306. With this arrangement, the disk card 306 can be activated by electric power from the electronic camera body only when data are to be transferred from the memory card 303b.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   first recording means for recording digital image data obtained by photographing in a removable nonvolatile semiconductor memory;
   detecting means for detecting attainment of a predetermined value of a residual storage capacity of the semiconductor memory; and
   second recording means adapted to be rotated for transferring and recording all the digital image data recorded by the first recording means to a storage medium having a storage capacity larger than that of the nonvolatile semiconductor memory, in accordance with a result of detection by the detecting means.

2. The electronic camera according to claim 1, wherein said semiconductor memory is mounted on a memory card capable of being loaded into and unloaded from a body of the electronic camera.

3. The electronic camera according to claim 1, wherein said storage medium is a disk to be loaded into a disk device removably fitted in a body of the electronic camera, the disk device being capable of rotating the disk to record or reproduce data as electric power is supplied from the electronic camera body.

4. The electronic camera according to claim 1, wherein said detecting means detects a reduction of the residual storage capacity of the nonvolatile semiconductor memory to a value equal to or less than half of a full storage capacity of the nonvolatile semiconductor memory.

5. An electronic camera comprising:
   a storage medium loading portion capable of receiving a removable storage medium for storing image pickup data of the electronic camera in a nonvolatile manner;
   a solid-state memory card including a storage medium formed of a solid-state nonvolatile memory having a given storage capacity and capable of being loaded into the storage medium loading portion;
   a disk card including a storage medium formed of a disk drive having a storage capacity larger than that of the solid-state memory card and capable of being loaded into the storage medium loading portion;
   residual capacity detecting means for detecting a free capacity of the solid-state memory card loaded in the storage medium loading portion and for delivering an output when the free capacity is reduced to a given value or less; and
   data transfer means for transferring the image pickup data from the solid-state memory card to the disk card in response to the output of the residual capacity detecting means.

6. An electronic camera comprising:
   a storage medium loading portion capable of receiving a removable storage medium for storing image pickup data of the electronic camera in a nonvolatile manner;
   a solid-state memory card including a storage medium formed of a solid-state memory having a given storage capacity and capable of being loaded into the storage medium loading portion;
   a disk card including a storage medium formed of a disk drive having a storage capacity larger than that of the solid-state memory card and capable of being loaded into the storage medium loading portion;
   residual capacity detecting means for detecting a free capacity of the solid-state memory card loaded in the storage medium loading portion and for delivering an output when the free capacity is reduced to a given value or less; and
   data transfer means for transferring the image pickup data from the solid-state memory card to the disk card in response to the output of the residual capacity detecting means;
   wherein said data transfer means includes warning means provided on a body of the electronic camera and adapted to issue a warning related to the free capacity of the solid-state memory card in response to the output of the residual capacity detecting means, and permission means adapted to permit the image pickup data to be transferred from the solid-state memory card to the disk card in response to manual operation.

7. The electronic camera according to claim 6, wherein said disk card is activated only when the image pickup data are to be transferred.

8. The electronic camera according to claim 6, wherein said disk card has a storage capacity at least 200 times as large as that of the solid-state memory card.

9. The electronic camera according to claim 6, wherein said given value of the free capacity detected by the residual capacity detecting means is half as large as a value of a full storage capacity of the solid-state memory card.

10. The electronic camera according to claim 6, wherein said storage medium is loaded into a personal computer system through an adapter so that image data stored in the storage medium can be transferred to a recording device of the personal computer system.

11. An electronic camera comprising:
   an imaging unit configured to generate an image file of an object;
   a first removable nonvolatile storage medium having a semiconductor nonvolatile memory device, configured to store the image file;

a second nonvolatile storage medium having a disk medium, configured to store the image file, wherein the second nonvolatile storage medium has a greater storing capacity than the first nonvolatile storage medium; and a storage medium controller configured to cause the generated image file to be stored in the first nonvolatile storage medium, and to detect a remaining free capacity of the first nonvolatile storage medium, and wherein the controller transfers the image file stored in the first nonvolatile storage medium to the second nonvolatile storage medium if the detected remaining free capacity of the first nonvolatile storage medium becomes less than a predetermined value.

12. The electronic camera according to claim 11, wherein the second nonvolatile storage medium is detachably attached to a body of the camera.

13. The electronic camera according to claim 11, further comprising warning means provided on a body of the camera for issuing a warning when the detected remaining free capacity in the first nonvolatile storing medium becomes less than the predetermined value.

* * * * *